(12) United States Patent
Rowe

(10) Patent No.: US 11,904,886 B1
(45) Date of Patent: Feb. 20, 2024

(54) MODIFYING AUTONOMOUS VEHICLE BEHAVIOR PREDICTION BASED ON BEHAVIOR PREDICTION ERRORS

(71) Applicant: Waymo LLC, Mountain View, CA (US)

(72) Inventor: Keja Rowe, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 338 days.

(21) Appl. No.: 17/401,583

(22) Filed: Aug. 13, 2021

(51) Int. Cl.
*B60W 60/00* (2020.01)
*B60W 40/09* (2012.01)
*G06N 20/00* (2019.01)
*G06F 18/21* (2023.01)
*G06F 18/214* (2023.01)

(52) U.S. Cl.
CPC .......... *B60W 60/001* (2020.02); *B60W 40/09* (2013.01); *G06F 18/214* (2023.01); *G06N 20/00* (2019.01); *B60W 2554/4049* (2020.02)

(58) Field of Classification Search
CPC ... B60W 60/001; B60W 40/09; G06F 18/214; G06N 20/00
See application file for complete search history.

(56) References Cited

U.S. PATENT DOCUMENTS

| | | | |
|---|---|---|---|
| 8,457,827 B1 * | 6/2013 | Ferguson | B60W 30/16 701/28 |
| 11,657,318 B2 * | 5/2023 | Sucan | G06N 20/00 706/12 |
| 2020/0125989 A1 * | 4/2020 | Sucan | B60W 50/0098 |

\* cited by examiner

*Primary Examiner* — Tyler J Lee
(74) *Attorney, Agent, or Firm* — Lowenstein Sandler LLP

(57) ABSTRACT

A system includes a memory device and a processing device, operatively coupled to the memory device, to obtain a set of predicted behavior data including data indicative of one or more predicted object behaviors for one or more respective objects in an environment of an autonomous vehicle, obtain a set of observed behavior data including data indicative of one or more observed object behaviors of the one or more objects, determine, based on a comparison of the set of predicted behavior data and the set of observed behavior data, whether a set of incorrect object behavior predictions exists within the set of predicted behavior data, and upon determining that the set of incorrect object behavior predictions exists, initiate, based on at least a generated subset of the set of incorrect object behavior predictions, one or more operations to address the set of incorrect object behavior predictions.

20 Claims, 7 Drawing Sheets

MODIFYING AUTONOMOUS VEHICLE BEHAVIOR PREDICTION BASED ON BEHAVIOR PREDICTION ERRORS

TECHNICAL FIELD

The instant specification generally relates to autonomous vehicles (AVs). More specifically, the instant specification relates to modifying AV behavior prediction based on behavior prediction errors.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

In one implementation, disclosed is a system including a memory device and a processing device, operatively coupled to the memory device, to obtain a set of predicted behavior data including data indicative of one or more predicted object behaviors for one or more respective objects in an environment of an autonomous vehicle, and obtain a set of observed behavior data including data indicative of one or more observed object behaviors of the one or more objects. The one or more predicted object behaviors are each associated with a prediction indicator of a predicted spatial overlap state between the autonomous vehicle and a corresponding object, and the one or more observed object behaviors are each associated with an observation indicator of an observed spatial overlap state between the autonomous vehicle and the corresponding object. The processing device is further to determine, based on a comparison of the set of predicted behavior data and the set of observed behavior data, whether a set of incorrect object behavior predictions exists within the set of predicted behavior data, and upon determining that the set of incorrect object behavior predictions exists, initiate, based on at least a generated subset of the set of incorrect object behavior predictions, one or more operations to address the set of incorrect object behavior predictions. Each incorrect object behavior prediction in the generated subset is associated with a respective error relevancy indicator that depends on at least a comparison between a corresponding observed spatial overlap state and a corresponding predicted spatial overlap state.

In another implementation, disclosed is a method. The method includes obtaining, by a processing device, a set of predicted behavior data including data indicative of one or more predicted object behaviors for one or more respective objects in an environment of an autonomous vehicle, and obtaining, by the processing device, a set of observed behavior data including data indicative of one or more observed object behaviors of the one or more objects. The one or more predicted object behaviors are each associated with a prediction indicator of a predicted spatial overlap state between the autonomous vehicle and a corresponding object, and the one or more observed object behaviors are each associated with an observation indicator of an observed spatial overlap state between the autonomous vehicle and the corresponding object. The method further includes determining, by the processing device based on a comparison of the set of predicted behavior data and the set of observed behavior data, whether a set of incorrect object behavior predictions exists within the set of predicted behavior data, and upon determining that the set of incorrect object behavior predictions exists, initiating, by the processing device based on at least a generated subset of the set of incorrect object behavior predictions, one or more operations to address the set of incorrect object behavior predictions. Each incorrect object behavior prediction in the generated subset is associated with a respective error relevancy indicator that depends on at least a comparison between a corresponding observed spatial overlap state and a corresponding predicted spatial overlap state.

In yet another implementation, disclosed is a non-transitory computer-readable storage medium having instructions stored thereon that, when executed by a processing device, cause the processing device to obtain, from a behavior prediction system of an autonomous vehicle, a set of predicted behavior data including data indicative of one or more predicted object behaviors for one or more respective objects in an environment of the autonomous vehicle, and obtain, from a behavior observation system of the autonomous vehicle, a set of observed behavior data including data indicative of one or more observed object behaviors of the one or more objects. The one or more predicted object behaviors are each associated with a prediction indicator of a predicted spatial overlap state between the autonomous vehicle and a corresponding object, and the one or more observed object behaviors are each associated with an observation indicator of an observed spatial overlap state between the autonomous vehicle and the corresponding object. The processing device is further to determine, based on a comparison of the set of predicted behavior data and the set of observed behavior data, whether a set of incorrect object behavior predictions exists within the set of predicted behavior data, determine that the set of incorrect object behavior predictions satisfies a triggering condition, and upon determining that the set of incorrect object behavior predictions satisfies the triggering condition, initiate, based on at least a generated subset of the set of incorrect object behavior predictions, one or more operations to address the set of incorrect object behavior predictions. Each incorrect object behavior prediction in the generated subset is associated with a respective error relevancy indicator that depends on at least a comparison between a corresponding observed spatial overlap state and a corresponding predicted spatial overlap state.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
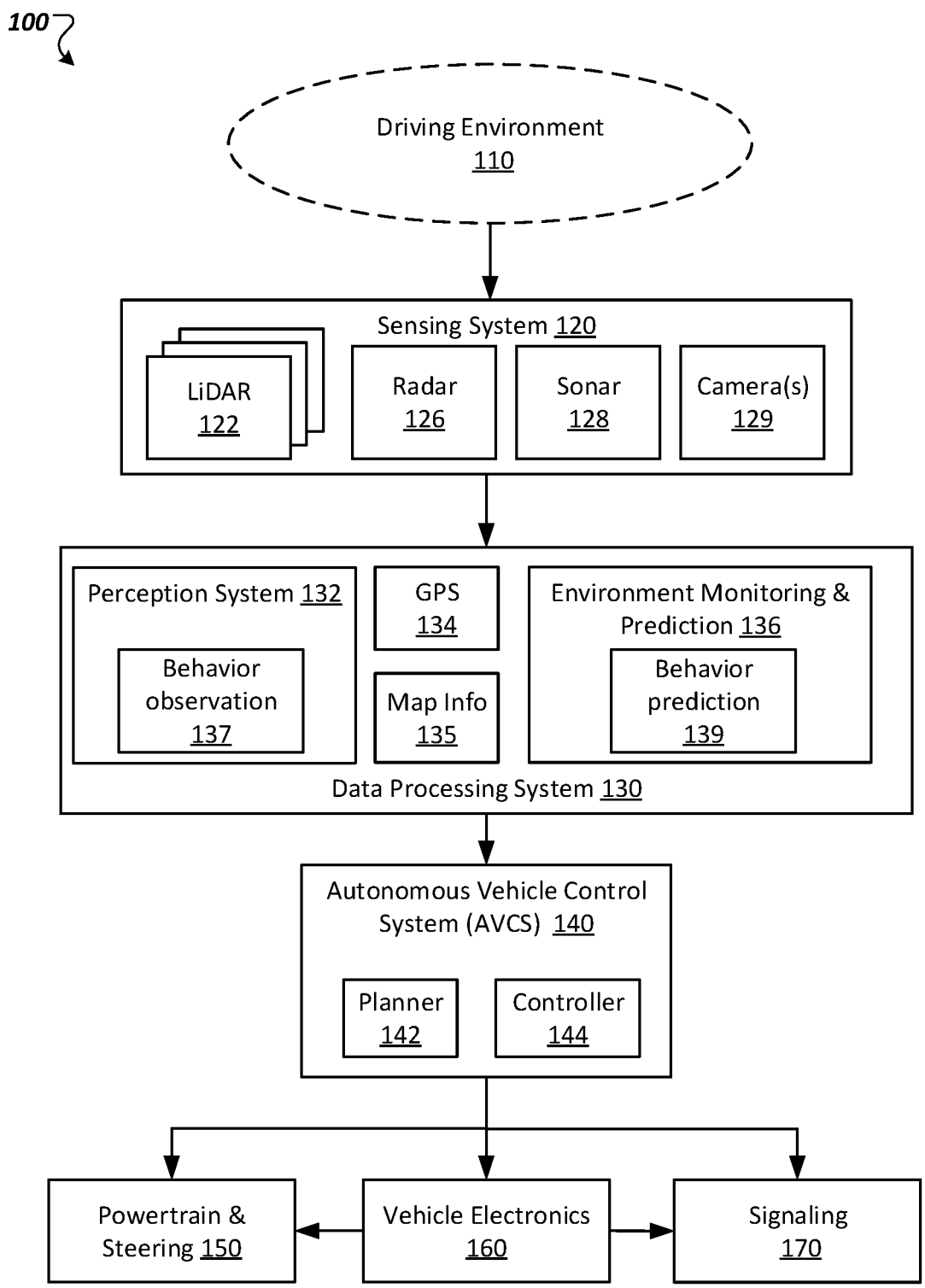
FIG. 1 is a diagram illustrating components of an example autonomous vehicle including an improved autonomous vehicle (AV) behavior prediction system, in accordance with some implementations of the present disclosure.

A vehicle travels a route from a starting location to a destination location. Routes include segments that have different elevations and grades (e.g., pitches, uphill sections, downhill sections) of different lengths. Routes also include segments that have different radius of curvature (e.g., winding roads of different lengths and grades). Some route segments are associated with historical data, such as historically windy segments, historically high-traffic segments, historically recommended lanes in segments, etc.

An autonomous vehicle (AV) performs vehicle actions, such as braking, steering, and throttling, to move the AV from the starting location to the destination location along the route. The AV can include a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data, the route data and predictions about how various objects of the AV driving environment will be positioned to generate short time horizon routing data. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can reflect substantially all the changes in the vehicle or the world (e.g., engine degradation, other objects changing course or speed or appearing suddenly). The routing module provides the short time horizon routing data to a motion control module. The motion control module controls the vehicle systems over the next interval of time (e.g., the next 10 seconds, next 100 ms) based on the short time horizon routing data The routing module continues generating (e.g., refreshing) new short time horizon routing data for the subsequent intervals of time based on the route data and the current sensor data from the perception system. The motion control module continues controlling the vehicle based on the new short time horizon routing data.

During operation of the AV, the AV may make an object behavior observation for an object in a driving environment that contradicts a corresponding object behavior prediction of the object in the driving environment. Examples of objects include other vehicles, pedestrians, etc. Object behavior error metrics, such as trajectory error metrics, can include metrics related to measuring errors between the object behavior prediction and the object behavior observation. Object behavior predictions can be generated by a behavior prediction system that predicts how an object will behave in a particular driving environment. Incorrect object behavior predictions can contribute to the AV making suboptimal AV driving decisions.

One way of determining an order for addressing incorrect object behavior predictions (e.g., debugging and improving) is based on a magnitude of the error between the object behavior observation and the corresponding object behavior prediction (e.g., an amount of distance between where a vehicle was observed to be located after a certain time and where the vehicle was predicted to be located after the certain time). However, some incorrect object behavior predictions can be less relevant than other incorrect object behavior predictions, regardless of error magnitude. For example, if a given incorrect object behavior prediction is obtained based on an object behavior observation made by the AV that has a zero or near-zero probability of affecting the driving path of the AV, it may be more or important or beneficial to address other incorrect object behavior predictions having a lower error magnitude than the given incorrect object behavior prediction to ensure AV operational safety.

Aspects of the disclosure address the above challenges, along with others, by improving AV behavior prediction systems based on behavior prediction errors of higher relevancy. For example, a set of observed behavior data can be collected during operation of the AV within a driving scene (e.g., in autonomous driving mode or manual driving mode). The set of observed behavior data can include data pertaining to actual observations made by the AV within the driving scene. For example, the set of observed behavior data can include AV observation data and object observation data associated with one or more objects present in the driving scene. The set of observed behavior data can be obtained from data logs created by the AV. The set of predicted behavior data includes data pertaining to expected or predicted behaviors of the one or more objects in the driving scene and can be generated by a behavior prediction system of the AV (e.g., every 100 ms). The set of observed behavior data can then be compared to a set of predicted behavior data to determine a set of behavior prediction errors. Each behavior prediction error can be determined based on a positional relationship between an observed object behavior and a predicted object behavior for a corresponding object observed in the driving scene. Such a positional relationship, referred to herein as a spatial overlap, indicates whether the AV and the object are predicted or observed to be at a spatial overlap region in the driving scene. A spatial overlap region refers to an area of a particular size that represents proximity between the AV and the object. The spatial overlap may coincide with a temporal overlap (the AV and the object may be predicted and/or observed to reach the spatial region at substantially the same time), or may not coincide with a temporal overlap (the AV and the object may be predicted and/or observed to reach the spatial overlap region at different times).

The spatial overlap can be represented by associating the predicted object behaviors and the observed object behaviors with respective indicators of a predicted or observed spatial overlap state between the AV and the corresponding object. In some implementations, each indicator is a label indicative of the spatial overlap state, which can be determined, for example, by comparing observed or predicted locations of the AV and the corresponding object at various points in time. For example, in the case that a spatial overlap is not predicted to exist between an object and the AV (e.g., if it is determined that the predicted locations of the AV and the object deviate within the driving scene), then a "no overlap" indicator can be assigned to the predicted object behavior in that scenario. Alternatively, if a spatial overlap is predicted to exist between the object and the AV (e.g., if it is determined that the predicted locations of the AV and the object coincide close enough to be considered part of a spatial overlap region within the driving scene), then an "overlap" indicator can be assigned to the predicted object behavior. Examples of "overlap" indicators can include a "pass" indicator, a "yield" indicator and a "collision" indicator, which can be determined based on a set of rules or assumptions and using both spatial and temporal parameters of the AV and the object. For example, if the AV is predicted to arrive at the spatial overlap region prior to the object, it is assumed that the object will let the AV pass first, and thus a "pass" indicator can be assigned to the predicted object behavior. If the AV is predicted to arrive at the spatial overlap region after the object, then it is assumed that the AV will yield to the object, and thus a "yield" indicator can be assigned to the predicted object behavior. If the AV and the object are predicted to simultaneously arrive at the spatial overlap region, then it is assumed that the AV and the object will have collided, and thus a "collision" indicator can be assigned to the predicted object behavior. A similar classification can be made with respect to the observed behavior for the corresponding object in that scenario.

If predicted behavior data for an object does not match observed behavior data for the object, it can be determined that an object behavior prediction is incorrect, even though a prediction error may not be relevant to the operation of the AV. To assess the relevancy of the prediction error, an observed overlap indicator and a predicted overlap indicator corresponding to the incorrect object prediction can be compared to determine whether they match. For example, if both the predicted overlap indicator corresponding to a first incorrect object prediction and the observed overlap indicator for that object are "no overlap" indicators, then the first incorrect object prediction has a corresponding match. In contrast, if the predicted overlap indicator corresponding to a second incorrect object prediction has a "no overlap" indicator and the observed overlap indicator for that object has an "overlap" indicator (e.g., "yield" indicator, "pass" indicator or "collision" indicator), then the second incorrect object prediction does not have a corresponding match. Since the second incorrect object prediction does not have a corresponding match while the first incorrect object prediction has a corresponding match, the second incorrect object prediction is deemed more relevant or important, and is prioritized over the first incorrect object prediction when initiating operations to improve accuracy of future object behavior predictions of the AV's behavior prediction system. To address situations where multiple incorrect object predictions do not correspond to matches, the incorrect predictions can be further prioritized using time-to-overlap or other suitable methods.

Aspects and implementations disclosed herein provide numerous advantages over existing technologies. For example, updating behavior predictions in accordance with the implementations described herein can improve behavior prediction systems of the AV in a way that can enable the planning of trajectories that are safer, more comfortable, and make better progress toward a destination along a route. By assessing prediction errors based on both spatial overlaps and temporal overlaps between the AV and the objects, the aspects and implementations disclosed herein can determine an efficient order of addressing incorrect predictions that can be used to ensure that more critical errors are addressed first and are avoided in the subsequently generated predictions.

FIG. 1 is a diagram illustrating components of an example autonomous vehicle (AV) 100 including an improved autonomous vehicle (AV) behavior prediction system, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones). For example, the perception system 132 can include a behavior observation system 137. The behavior observation system 137 can receive data from the sensing system 120, and can generate a set of observed behavior data based on the data received from the sensing system 120. Observed behavior data can be stored, for example, as data logs.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

For example, the environment monitoring and prediction component 136 can include a behavior prediction system 139. The behavior prediction system 139 can receive data from the sensing system 120, and can generate (e.g., every 100 ms) a set of predicted behavior data based on the data received from the sensing system 120. In some embodiments, the behavior prediction system 139 includes an object behavior module that is programmed (e.g., using code) to predict object behaviors based on a set of rules. Alternatively, the behavior prediction system 139 includes a machine learning model that is trained to predict object behaviors using training data. Yet alternatively, the behavior prediction system 139 includes both object behavior module and the machine learning model that are both used to predict object behaviors. As discussed in more detail herein, aspects of the present disclosure can identify behavior prediction errors, prioritize these errors based on relevancy or severity and initiate operations to improve the accuracy of predictions of the behavior prediction system 139. In some embodiments, the operations include generating a prioritized list of incorrect behavior predictions, which is used to modify the set of rules for reprogramming the object behavior module of the behavior prediction system 139. Alternatively or in addition, the operations include providing the prioritized list of incorrect behavior predictions to retrain the machine learning model of the behavior prediction system 139. Due to the high frequency of predictions generated by the behavior prediction system 139, the prioritization of errors ensures fast correction of the most relevant errors.

The data generated by the perception system 132, the GPS data processing module 134, and the environment monitoring and prediction component 136, can be received by an autonomous driving system, such as AV control system (AVCS) 140. The AVCS 140 can include one or more algorithms that control how the AV is to behave in various driving situations and environments.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

For example, the AVCS 140 can include a planner 142 that can receive future trajectory predictions of objects (e.g., pedestrians, other vehicles) in a scene, and generate a planned trajectory for the AV based on the future trajectory predictions. Although the planner 142 is shown as being a component of the AVCS 140, the planner 142 can be a standalone component, or can be a component of another system of the AV (e.g., data processing system 130). The AVCS 140 can further include a controller 144 that receives the planned trajectory for the AV, and generates instructions for various systems and components of the vehicle, such as the powertrain and steering 150, vehicle electronics 160, signaling 170, and other systems and components not explicitly shown in FIG. 1.

The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
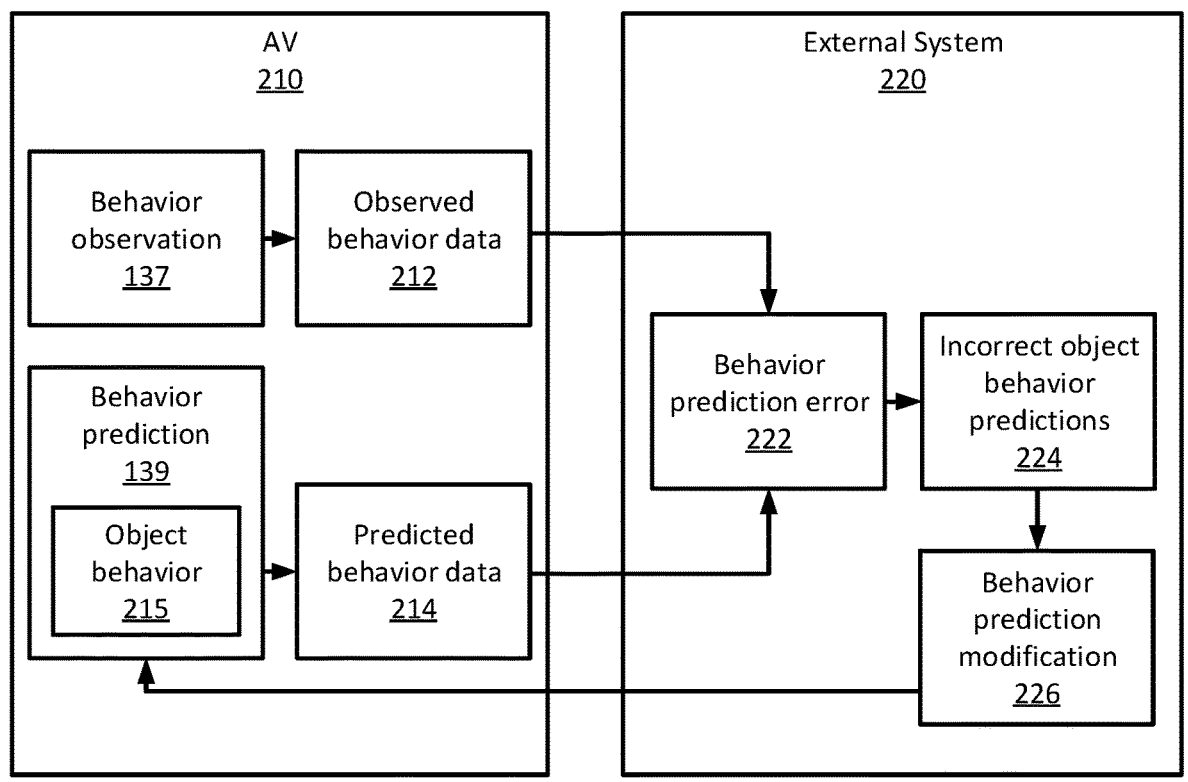
FIG. 2 is a diagram illustrating an example system for improving object behavior predictions based on identified prediction errors, in accordance with some implementations of the present disclosure.

FIG. 2 is a diagram illustrating an example system 200 for improving object behavior predictions based on identified prediction errors, in accordance with some implementations of the present disclosure. As shown, the system 200 can include an AV 210 (e.g., the AV 100 of FIG. 1) in communication with an external system 220. For example, the external system 220 can be an offboard system.

The AV 210 can include the behavior observation system 137 that can generate a set of observed behavior data 212, and the behavior prediction system 139 that can generate a set of predicted behavior data 214. For example, the behavior prediction system 139 can include an object behavior module 215 that is programmed to predict object behaviors using a set of rules.

The set of predicted behavior data 214 can include data pertaining to predictions made by the AV 210 within the driving scene. For example, the set of predicted behavior data 214 can include data indicative of one or more predicted object behaviors for the one or more objects observed by the AV 210 in the scene.

As shown, the external system 220 can include a behavior prediction error component 222. The behavior prediction error component 222 can determine, based on predicted behavior of a corresponding object, a predicted overlap indicator indicative of a predicted spatial overlap state between the autonomous vehicle and the corresponding object. For example, a predicted overlap indicator can be an indicator identifying no predicted spatial overlap between the AV 210 and the corresponding object, or an indicator identifying a predicted spatial overlap between the AV 210 and the corresponding object. The indicator identifying a predicted spatial overlap can be further specified based on when the AV 210 and the object are predicted to arrive at a predicted spatial overlap region. For example, a pass indicator can identify that the AV 210 arrives at a predicted spatial overlap region before the corresponding object, a yield indicator can identify that the AV 210 arrives at the predicted spatial overlap region after the corresponding object, and a collision indicator can identify that the AV 210 and the corresponding object arrive at the predicted spatial overlap region at a substantially same time.

The set of observed behavior data 212 can include data pertaining to actual observations made by the AV 210 within the driving scene. For example, the set of observed behavior data can include data indicative of observed AV behavior of the AV 210 and data indicative of one or more observed object behaviors of one or more objects observed in the scene. The set of observed behavior data can obtained from data logs created by the AV 210. Similar to the predicted overlap indictor, an observed overlap indicator can be determined for each of the one or more observed object behaviors. Accordingly each of the predicted behaviors of the set of predicted behavior data 214 and the observed behaviors of the set of observed behavior data 212 can be classified in accordance with classification criteria related to an overlap event.

The behavior prediction error component 222 can obtain the set of observed behavior data 212 and the set of predicted behavior data 214, and determine, based on a comparison of the set of observed behavior data 212 and the set of predicted behavior data 214, whether one or more incorrect object behavior predictions exists within the set of predicted behavior data 214. If so, the behavior prediction error component 222 can output a set of incorrect object behavior predictions 224. For example, the set of incorrect object behavior predictions 224 can include one or more object behavior predictions that are each identified as incorrect from the set 214 based on the object behavior observation from the set 212 for the corresponding object observed in the scene.

The external system 220 can initiate one or more operations to address the set of incorrect object behavior predictions 224. For example, the external system 200 can further include a behavior system modification component 226 that can initiate, based on at least a generated subset of the set of incorrect object behavior predictions, one or more operations to address the set of incorrect object behavior predictions. More specifically, the one or more operations can be performed to modify (e.g., debug and improve) the behavior prediction system 139 to improve behavior prediction generation, thereby improving object behavior prediction performed by the behavior prediction system 137 and reducing future behavior prediction errors during operation of the AV 210. For example, the generated subset can be used to modify the set of rules for reprogramming the object behavior module 215. In some implementations, the behavior prediction system 139 includes a machine learning model that is trained to predict object behaviors using training data. To initiate the one or more operations to address the set of incorrect object behavior predictions 224, the generated subset can be provided to the behavior prediction system 139 as additional training data to retrain the machine learning model.

The behavior system modification component 226 can determine, for each incorrect object behavior prediction in the generated subset, a respective error relevancy indicator of a relevance of the incorrect object behavior prediction. The determination can be done by comparing a corresponding observed spatial overlap state with a corresponding predicted spatial overlap state. For example, if the incorrect object behavior prediction and the corresponding object behavior observation have a matching indicator (e.g., both have a "no overlap" indicator), this incorrect object behavior prediction is deemed as a lower priority incorrect object behavior prediction as compared to if it had a non-matching indicator (e.g., the incorrect object behavior prediction having a "no overlap" indicator and the corresponding object behavior observation having a "yield" indicator).

If multiple incorrect object behavior predictions exist, the generated subset can be provided in a form that organizes the incorrect object behavior predictions based on their error relevancy indicators. For example, the incorrect object behavior predictions can be sorted (e.g., ranked) based at least in part on whether their predicted and observed spatial overlap states are matching or non-matching. To address situations where multiple incorrect behavior predictions having non-matching indicators exist, these incorrect behavior predictions can then be sorted in order of importance or relevance using time-to-overlap or other suitable methods. For example, the incorrect object behavior predictions with non-matching predicted and observed spatial overlap states can be further prioritized based on time-to-overlap metrics (e.g., a metric indicating how long it would take for a corresponding object to spatially overlap with the AV) and/or distance-to-overlap metric (e.g., a metric indicating distance between a corresponding object and the AV at a particular point), where an incorrect object behavior prediction with a shorter time-to-overlap metric and/or distance-to-overlap metric can be prioritized over an incorrect object behavior prediction with a longer time-to-overlap metric and/or di stance-to-overlap metric.

Further details regarding the operation of the system 200 will be described below with reference to FIGS. 3-5.

Figure 3:
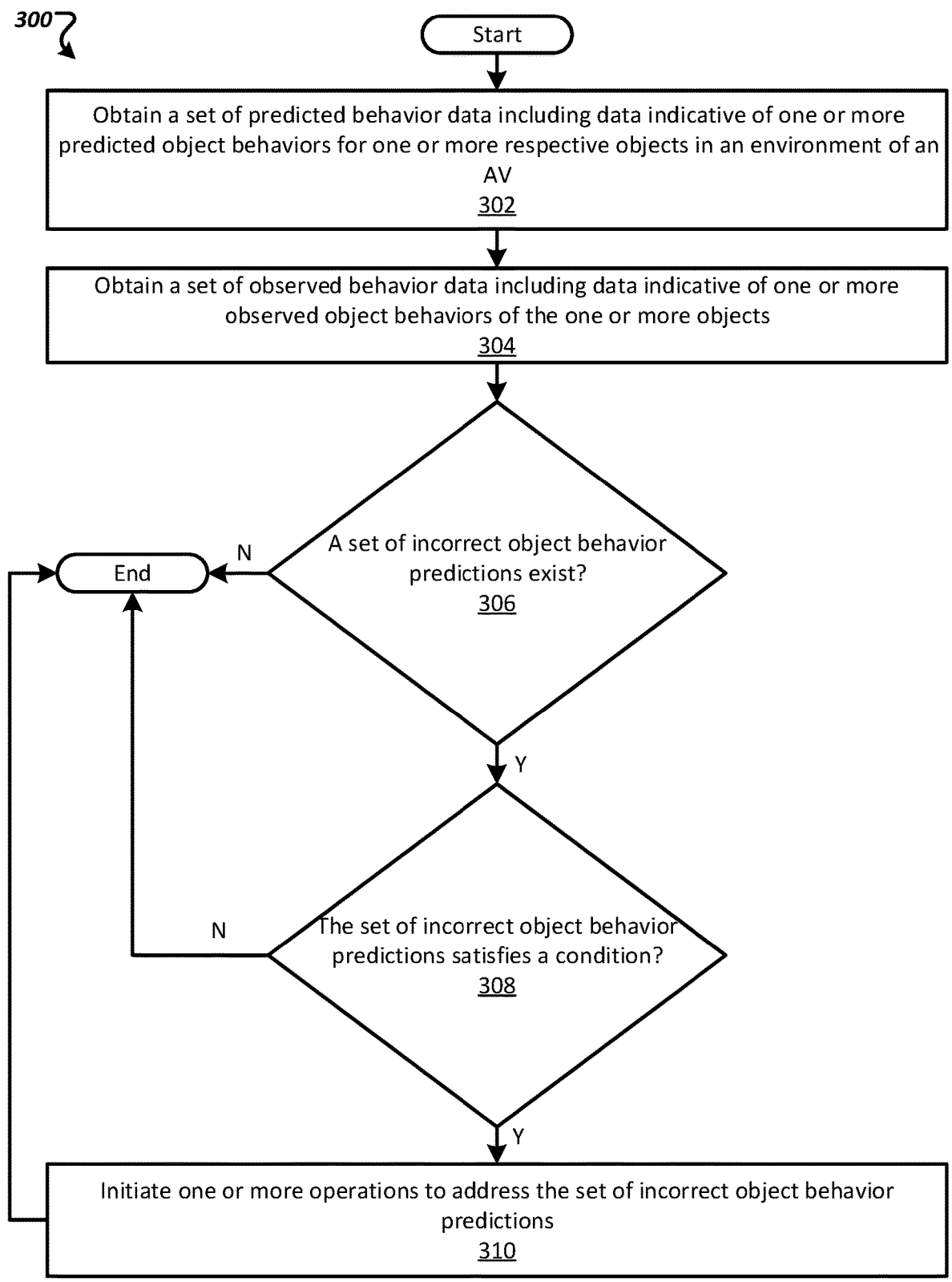
FIG. 3 is a flow diagram of an example method for improving object behavior predictions based on identified prediction errors, in accordance with some implementations of the present disclosure.

FIG. 3 is a flow diagram of an example method 300 for improving object behavior predictions based on identified prediction errors, in accordance with some implementations of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an external system (e.g., the external system 220 of FIG. 2). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 302, the processing logic obtains a set of predicted behavior data including data indicative of one or more predicted object behaviors for one or more respective objects in an environment of an autonomous vehicle (AV). For example, the one or more objects can be observed within an AV driving scene ("scene"). Predicted object behavior can include any behavior predicted with respect to one or more other objects in the environment. For example, the predicted object behavior can be a prediction regarding how another vehicle observed by the AV will behave within the environment.

The predicted behavior data can be generated by a behavior prediction system of the AV. For example, the behavior prediction system can implement a machine learning model trained to generate the set of predicted behavior data based on an input. The input can include a roadgraph including a number of lanes. The machine learning model can be trained based on training data that includes, for example, features or observations from previously incorrect object behavior predictions.

The one or more predicted object behaviors can each be associated with a prediction indicator of a predicted spatial overlap state between the AV and a corresponding object. In some implementations, the prediction indicator is a label indicative of the predicted spatial overlap state, which can be determined using, for example, a set of rules or assumptions. Each prediction indicator can be one of a "no predicted overlap" indicator identifying no predicted spatial overlap between the AV and the corresponding object, or a "predicted overlap" indicator identifying a predicted spatial overlap between the AV and the corresponding object. For example, the predicted overlap indicator can be a "predicted pass indicator" identifying that the AV arrives at a predicted spatial overlap region before the corresponding object, a "predicted yield" indicator identifying that the AV arrives at the predicted spatial overlap after the corresponding object, and a "predicted collision" indicator identifying that the AV and the corresponding object arrive at the predicted spatial overlap at a substantially same time.

At operation 304, the processing logic obtains a set of observed behavior data including data indicative of one or more observed object behaviors of the one or more objects. Similar to the one or more predicted object behaviors, the one or more observed object behaviors can each be associated with an observation indicator of an observed spatial overlap state between the AV and the corresponding object. The set of observed behavior data can further include data indicative of observed AV behavior of the AV.

For example, the set of observed behavior data can identify, for each of the one or more observed object behaviors, an observed spatial overlap state between the AV and the corresponding object, and the processing logic can associate each of the one or more observed object behaviors with an observation indicator that represents the observed spatial overlap state between the AV and the corresponding object. In some implementations, the observation indicator is a label indicative of the observed spatial overlap state. The observed overlap indicator can be one of a "no observed overlap" indicator identifying no observed spatial overlap between the AV and the corresponding object, or an "observed overlap" indicator identifying an observed spatial overlap between the AV and the corresponding object. For example, the observed overlap indicator can be an "observed pass indicator" identifying that the AV arrives at an observed spatial overlap region before the corresponding object, an "observed yield" indicator identifying that the AV arrives at the observed spatial overlap after the corresponding object, and an "observed collision" indicator identifying that the AV and the corresponding object arrive at the observed spatial overlap at a substantially same time.

At operation 306, the processing logic determines whether one or more incorrect object behavior predictions exist within the set of predicted behavior data. An object behavior prediction can be designated as an incorrect object behavior prediction if a comparison between the predicted object behavior and a corresponding observed object behavior identifies at least one of: an error in distance between a predicted location of an object and an observed location of the object, or a mismatch in the predicted spatial overlap state and the corresponding observed spatial overlap state. If no incorrect object behavior predictions exist, this means that no action needs to be taken to address incorrect object behavior predictions, and the process ends.

Alternatively, if one or more incorrect object behavior predictions exist, at operation 308, the processing logic determines whether the set of incorrect object behavior predictions satisfies a (trigger) condition. The condition can be a trigger condition to initiate one or more operations to address the set of incorrect object behavior predictions. In some implementations, as will be described in further detail below with reference to FIG. 4, the process performed at operation 308 can include determining whether the number of incorrect object behavior predictions satisfies a threshold condition (e.g., whether the number of incorrect object behavior predictions is equal to or greater than a threshold number of incorrect object behavior predictions). In some implementations, as will be described in further detail below with reference to FIG. 5, the condition is that at least one incorrect object behavior prediction exists in the set of incorrect object behavior predictions (e.g., the set of incorrect object behavior predictions is not the null set).

Upon determining that the set of incorrect object behavior predictions satisfies the condition, then at operation 310, the processing logic initiates one or more operations to address the set of incorrect object behavior predictions. The one or more operations can be initiated based on at least a generated subset of the set of incorrect object behavior predictions. Each incorrect object behavior prediction in the generated subset can be associated with a respective error relevancy indicator that depends on at least a comparison between a corresponding observed spatial overlap state and a corresponding predicted spatial overlap state. The error relevancy indicator of an incorrect object behavior prediction is indicative of a relevancy of the incorrect object behavior prediction, within the generated subset, that is determined based on whether the observed spatial overlap state of the observation and the predicted spatial overlap of the incorrect object behavior prediction match. An incorrect object behavior prediction having non-matching predicted and observed spatial overlap states is deemed as being more relevant or important as compared an incorrect object behavior prediction having matching predicted and observed spatial overlap states, and thus incorrect object behavior predictions can be prioritized at least based on their respective predicted and observed spatial overlap states.

For example, the set of incorrect object behavior predictions can include a first incorrect object behavior prediction corresponding to a first object and a second incorrect object behavior prediction corresponding to a second object. The first incorrect object behavior prediction can be associated with a first prediction indicator of a first predicted spatial overlap state and the second incorrect object behavior prediction can be associated with a second prediction indicator of a second predicted spatial overlap state. The set of observed object behaviors can include a first observed object behavior corresponding to the first object and a second observed object behavior corresponding to the second object. The first observed object behavior can be associated with a first observation indicator of a first observed spatial overlap state and the second observed object behavior can be associated with a second observation indicator of a second observed spatial overlap state.

To initiate the one or more operations to address the set of incorrect object predictions, the processing logic can associate the first incorrect object behavior prediction with a first error relevancy indicator of a first relevancy upon determining that the first predicted spatial overlap state does not match the first observed spatial overlap state, and associate the second incorrect object behavior prediction with a second error relevancy indicator of a second relevancy upon determining that the second predicted spatial overlap state matches the second observed spatial overlap state, in which the first relevancy is greater than the second relevancy, and the first error relevancy indicator represents a higher priority of the first incorrect object behavior prediction with respect to the second incorrect object behavior prediction within the generated subset.

As another example, assume that the set of incorrect object behavior predictions further includes a third incorrect object behavior prediction corresponding to a third object. The third incorrect object behavior prediction can be associated with a third prediction indicator of a third predicted spatial overlap state. The set of observed object behaviors can further include a third observed object behavior corresponding to the third object. The third observed object behavior can be associated with a third observation indicator of a third observed spatial overlap state.

To initiate the one or more operations to address the set of incorrect object predictions, the processing logic can associate the third incorrect object behavior prediction with a third error relevancy indicator of a third relevancy upon determining that the third predicted spatial overlap state does not match the third observed spatial overlap state. Since the third prediction spatial overlap state does not match the third observed spatial overlap state, the third relevancy represents a higher priority of the third incorrect object behavior prediction with respect to the second incorrect object behavior prediction.

In this example, both of the first and third incorrect object behavior predictions have mismatched spatial overlap states. One or more alternative metrics can be used to determine the relative priority between the first and third incorrect object behavior predictions. One example of an alternative metric is time-to-overlap. For example, if the time-to-overlap with respect to the observed spatial overlap corresponding to the first object is less than a time-to-overlap with respect to the observed spatial overlap corresponding to the third object, then the first incorrect object prediction can have a greater relevancy than the third incorrect object prediction (as this indicates the potential of a more imminent spatial overlap event). Accordingly, in this example, the third error relevancy indicator represents a higher priority of the third incorrect object behavior prediction has a higher priority with respect to the second incorrect object behavior prediction and a lower priority with respect to the first incorrect object behavior prediction within the generated subset.

In some implementations, initiating the one or more operations to address the set of incorrect object behavior predictions further includes generating the subset of incorrect behavior predictions, where the generated subset is used to modify a set of rules for reprogramming an object behavior module of the behavior prediction system of the AV. The incorrect behavior predictions in the generated subset can be sorted in accordance with respective error relevancy indicators to ensure that modification of the set of rules begins with rules that correspond to higher priority incorrect object behavior predictions.

In some implementations, the behavior prediction system of the AV includes a machine learning model that is trained to predict object behaviors using training data. Initiating the one or more operations to address the set of incorrect object behavior predictions can further include providing the generated subset as additional training data to retrain the machine learning model of the behavior prediction system. For example, the generated subset can include training data classified or weighted based on error relevancy (e.g., spatial overlap matching) to further refine the machine learning model. Therefore, the additional training data used to retrain the machine learning model can include the respective error relevancy indicator of each incorrect object behavior prediction from the generated subset. Further details regarding operations 308 and 310 will now be described below with reference to FIGS. 4 and 5.

Figure 4:
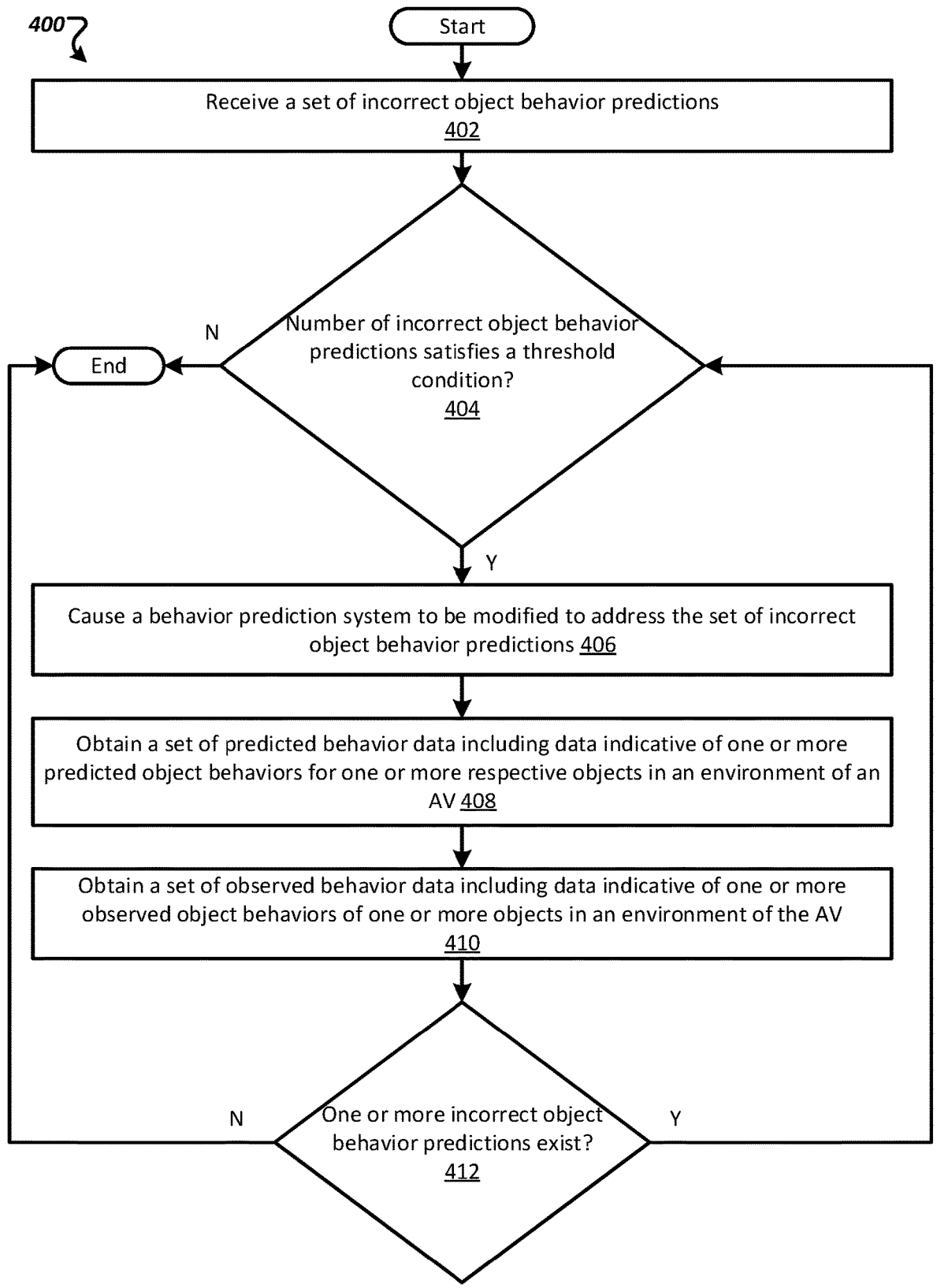
FIG. 4 is a flow diagram of an example method for initiating operations to address incorrect object behavior predictions, in accordance with some implementations of the present disclosure.

FIG. 4 is a flow diagram of an example method 400 for initiating operations to address incorrect object behavior predictions, in accordance with some implementations of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an external (e.g., offboard) system. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 402, the processing logic receives a set of incorrect object behavior predictions. The set of incorrect object behavior predictions can include one or more incorrect object behavior predictions determined to exist within a set of predicted behavior data, where the set of predicted behavior data includes one or more predicted object behaviors of one or more respective objects in an environment of an AV.

At operation 404, the processing logic determines whether a number of incorrect object behavior predictions of the set of incorrect object behavior predictions satisfies a threshold condition. The threshold condition can correspond to a sufficiently low number of errors so as to not cause undesirable AV behavior. For example, determining whether the number of incorrect behavior predictions of the set of prediction behavior data satisfies the threshold condition can include determining whether the number of incorrect behavior predictions is less than a threshold number of incorrect behavior predictions.

If the number of incorrect behavior predictions fails to satisfy the threshold condition, this means that the behavior prediction system need not be modified in view of the number of incorrect objet behavior predictions, and the process ends. Otherwise, at operation 406, the processing logic initiates a set of operations to cause a behavior prediction system to be modified to address the set of incorrect object behavior predictions, as discussed in more detail herein. The behavior prediction system is included within the AV and generates behavior predictions during operation of the AV.

At operation 408, after the behavior prediction system has been modified, the processing logic obtains a set of predicted behavior data including data indicative of one or more predicted object behaviors for one or more respective objects in an environment of an AV (similar to operation 302 of FIG. 3). At operation 410, the processing logic obtains a set of observed behavior data including data indicative of one or more observed object behaviors of one or more objects in an environment of the AV (similar to operation 304 of FIG. 3).

At operation 412, it is determined if one or more incorrect object behavior predictions exist. More specifically, similar to operation 306 of FIG. 3, it is determined, in view of the set of observed behavior data, whether the set of object behavior predictions includes one or more incorrect object behavior predictions. If no incorrect object behavior predictions exist, this means that no action needs to be taken, and the process ends. However, if one or more incorrect object behavior predictions exist, the process reverts back to operation 404 to determine whether the number of incorrect object behavior predictions satisfies a threshold condition. Further details regarding operations 402-412 are described above with reference to FIG. 3.

Figure 5:
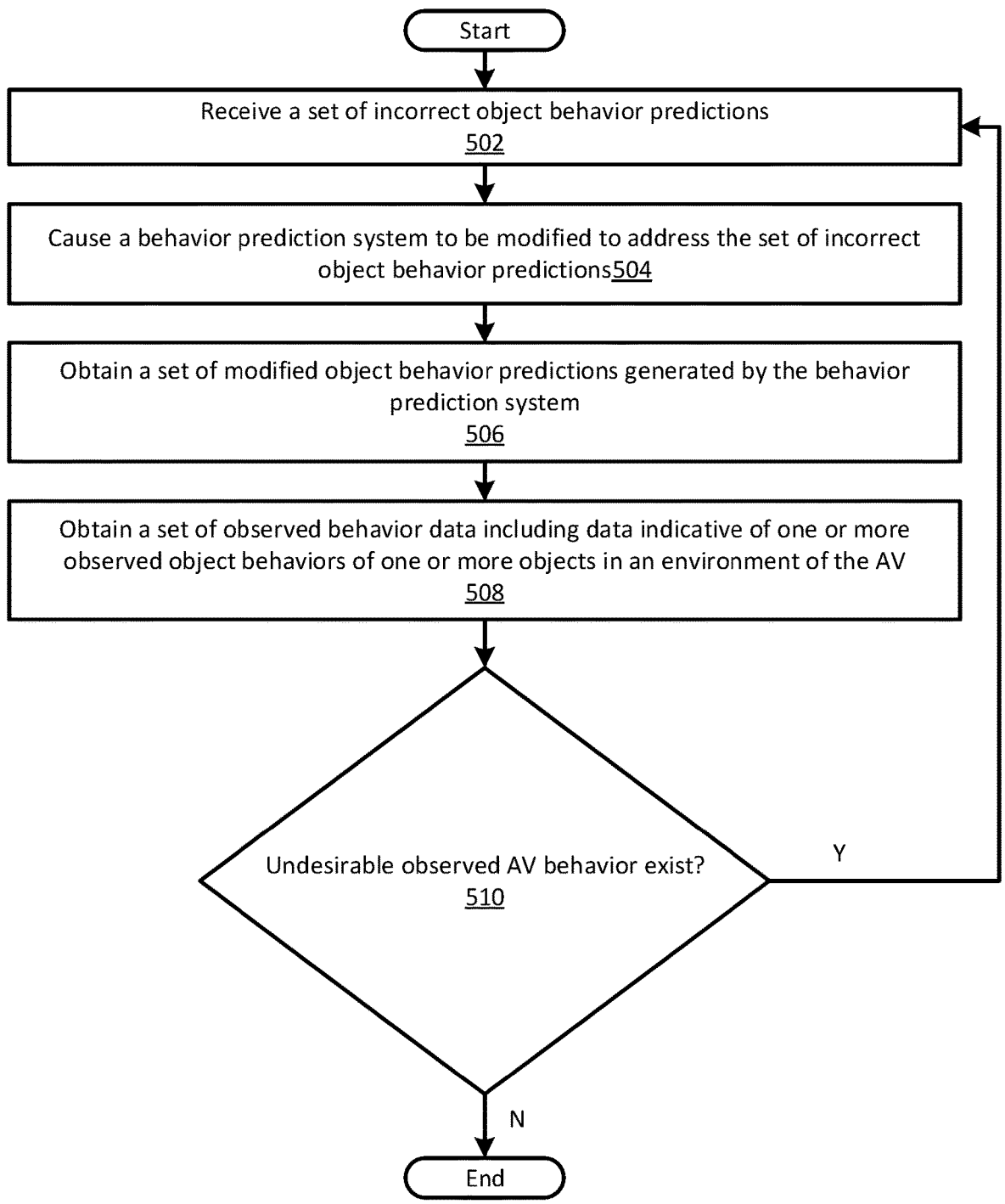
FIG. 5 is a flow diagram of another example method for initiating operations to address incorrect object behavior predictions, in accordance with some implementations of the present disclosure.

FIG. 5 is a flow diagram of another example method 500 for initiating operations to address incorrect object behavior predictions, in accordance with some implementations of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an external (e.g., offboard) system. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 502, the processing logic receives a set of incorrect object behavior predictions. The set of incorrect object behavior predictions can include one or more incorrect object behavior predictions determined to exist within a set of predicted behavior data, where the set of predicted behavior data includes one or more predicted object behaviors of one or more respective objects in an environment of an AV.

At operation 504, the processing logic initiates a set of operations to cause a behavior prediction system to be modified to address the set of incorrect object behavior predictions. In this example, the number of incorrect object behavior predictions in the set of incorrect object behavior predictions need not be analyzed in view of a threshold condition prior to modifying the behavior prediction system.

After the behavior prediction system has been modified, at operation 506, the processing logic obtains a set of modified object behavior predictions generated by the behavior prediction system. At operation 508, the processing logic obtains a set of observed behavior data including data indicative of one or more observed object behaviors of one or more objects in an environment of the AV.

At operation 510, the processing logic determines whether any undesirable observed AV behavior exists. More specifically, the processing logic determines whether the set of observed behavior data includes any observed AV behavior data that indicates improper or incorrect navigation with respect to the set of object behavior predictions, in view of the set of modified behavior predictions. If no undesirable observed AV behaviors are determined to exist, this means that the AV is exhibiting desirable driving behavior in view of the set of modified behavior predictions and that there is no current need to further modify the behavior prediction system. Therefore, the process ends. Otherwise, undesirable observed AV behavior indicates that there are incorrect object behavior predictions. Therefore, the process reverts back to operation 502 to receive the corresponding set of incorrect object behavior predictions from the behavior prediction system in order to further modify the behavior prediction system.

The method 400 of FIG. 4 and the method 500 of FIG. 5 can become functionally equivalent if one chooses threshold conditions in FIG. 4 (e.g., a sufficiently small threshold for the number of incorrect object behavior predictions) such that the AV does not display undesirable behavior when the prediction system satisfies the threshold(s). Further details regarding operations 502-510 are described above with reference to FIGS. 3 and 4.

Figure 6:
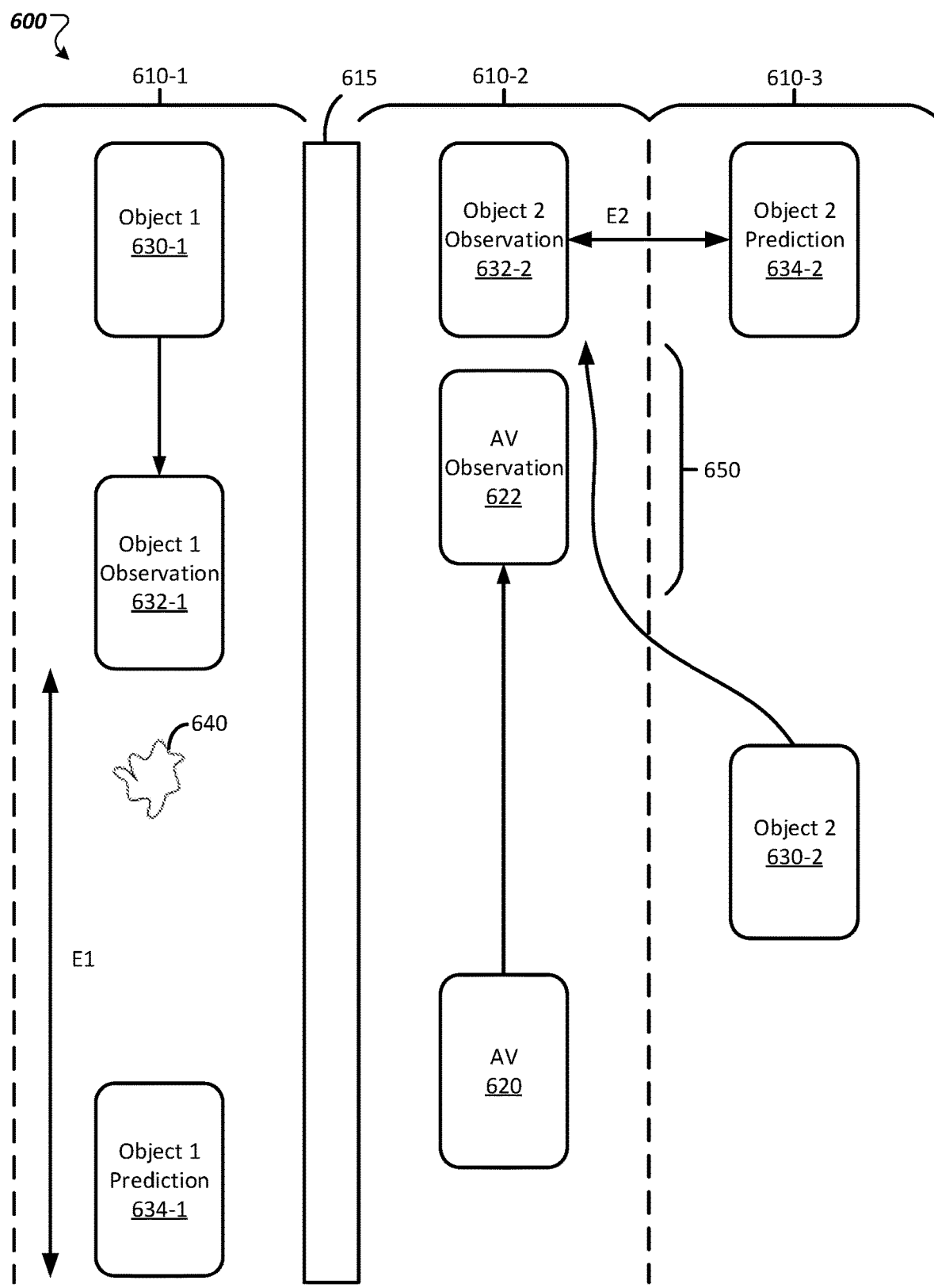
FIG. 6 illustrates examples of incorrect behavior predictions for objects in an autonomous vehicle (AV) driving environment, in accordance with some implementations of the present disclosure.

FIG. 6 is a diagram 600 illustrating examples of incorrect behavior predictions for objects in an autonomous vehicle (AV) driving environment, in accordance with some implementations of the present disclosure. The diagram 600 includes a number of lanes including lanes 610-1 through 610-3, where lanes 610-1 and lane 610-2 are separated by a divider 615. The lanes 610-1 through 610-3 are example lanes for purposes of illustration, and additional lanes (not shown) can also exist in the environment (e.g., scene).

The traffic in lane 610-1 flows in a first direction, while the traffic in lanes 610-2 and 610-2 flows in a second direction opposite the first direction. The divider 615 is an object that prevents traffic from lane 610-1 to enter lane 610-2 (and vice versa). For example, the environment can be a highway driving environment, where the lanes 610-1 through 610-3 are highway lanes and the divider 615 is a highway median.

As shown, an AV 620 is operating in lane 610-2. The AV 620 can be operating in autonomous driving mode, or in manual driving mode. As further shown, a first object, Object 1 630-1, is operating in lane 610-1 and a second object, Object 2 630-2, is operating in lane 610-3. In this example, Object 1 630-1 and Object 2 630-2 are other vehicles. However, an object can be any non-AV entity that is present in the environment (e.g., pedestrian, vehicle). An obstruction 640 is present within lane 610-1. The obstruction 640 can be any obstruction that modifies the expected or predicted path of an object (e.g., causes a path detour). In this illustrative example, the obstruction 640 is a pothole in the middle of the lane 610-1.

During operation of the AV 620 in the environment, a set of observed behavior data can be collected. The set of observed behavior data can include data indicative of one or more observed AV behaviors for the AV 620 and one or more observed object behaviors for each of the objects in the environment (e.g., Object 1 630-1 and Object 2 630-2). For example, the set of observed behavior data can include observed locations of the AV 620 and the objects in the environment from a starting point to an ending point after a certain time period. In this example, an observed location of AV 620 after the time period corresponds to AV Observation 622, an observed location of Object 1 630-1 after the time period corresponds to Object 1 Observation 632-1, and an observed location of Object 2 630-2 after the time period corresponds to Object 2 Observation 632-2.

Prior to operation of the AV 620 in the environment, a set of predicted behavior data can be obtained indicative of one or more expected or predicted object behaviors for each of the objects in the environment. For example, the set of behavior predictions can be generated in view of a roadgraph that includes paths modeling the environment. The set of behavior prediction data can include a predicted location of an object present in the environment from a starting point to an ending point during the time period. In this example, an expected location of Object 1 630-1 after the time period corresponds to Object 1 Prediction 634-1, and an expected location of Object 2 630-2 after the same time period corresponds to Object 2 Prediction 634-2.

As shown in FIG. 6, the set of observed behaviors made by the AV 620 during operation in the environment does not align with the set of predicted behaviors, resulting in incorrect object behavior predictions. For example, Object 1 630-1 had to slow down (e.g., stop) to avoid the obstruction 640. This slow down resulted in an incorrect object behavior prediction for Object 1 630-1 having an error distance ("E1") between the observed location corresponding to Object 1 Observation 632-1 and the predicted location corresponding to Object 1 Prediction 634-1. As another example, Object 2 630-2 decided to make an unexpected lane change from lane 610-3 into lane 610-2. This unexpected lane change resulted in an incorrect object behavior prediction for Object 2 630-2 having an error distance ("E2") between the observed location corresponding to Object 2 Observation 632-2 and the predicted location corresponding to Object 1 Prediction 634-2.

A naïve way of determining a modification order for modifying these incorrect object behavior predictions would be based on error distance magnitude. For example, if E1 corresponds to an error distance of 50 meters (m) and E2 corresponds to an error distance of 3 m, then the incorrect object behavior prediction for Object 1 630-1 (Object 1 Prediction 634-1) is determined to be more important than the incorrect object behavior prediction for Object 2 630-2 (Object 2 Prediction 634-2), as E1 is larger than E2. However, since Object 1 630-1 is driving in the lane 610-1 separated by the divider 615, the incorrect object behavior prediction for Object 1 630-1 will have substantially no impact as compared relative to the incorrect object behavior prediction for Object 2 630-2 (as Object 2 630-2 is observed to enter the same lane as the AV 620).

To address situations such as this one, aspects of the present disclosure address the incorrect object behavior predictions in accordance with at least one of a priority, relevancy, weight or modification order determined, based at least in part, on a predicted spatial overlap state between the AV 620 and the objects in the environment. For example, the Object 1 Prediction 634-1 and the Object 2 Prediction 634-2 are each associated with a "no predicted overlap" indicator (since Object 1 630-1 and Object 2 630-2 are each predicted to stay in their respective lanes 610-1 and 630-3).

No spatial overlap is observed between Object 1 630-1 and the AV 620 as indicated by the path resulting in the Object 1 Observation 632-1. Therefore, the Object 1 Observation 632-1 can also be associated with a "no observed overlap" indicator, which corresponds to matching prediction and observation indicators with respect to Object 1 630-1.

However, contrary to the prediction, an observed spatial overlap corresponding to spatial overlap region 650 has been identified between Object 2 630-2 and the AV 620, as indicated by the path resulting in the Object 2 Observation 632-2. Therefore, the Object 2 Observation 632-2 can be associated with an "observed overlap indicator," which means that the predicted and observed indicators corresponding to Object 2 630-2 are different. In this illustrative example, Object 2 630-2 arrives at the spatial overlap region 650 before the AV 620, and thus the observed indicator can be further defined as a "yield" indicator (since the AV 620 should yield to Object 2 630-2 in this situation). However, if Object 2 630-2 were to arrive at the spatial overlap region 650 after the AV 620, the observed indicator could be a "pass" indicator (since the AV 620 should pass Object 2 630-2 in this situation). Alternatively, if Object 2 630-2 and the AV 620 were to arrive at the spatial overlap region 650 at the substantially same time, the observed indicator could be a "collision" indicator (since the AV 620 should collide with the Object 2 630-2 in this situation).

Since the prediction and observed indicators corresponding to Object 1 630-1 are the same (both "no overlap"), whereas the prediction and observed indicators corresponding to Object 1 are different (the predicted overlap indicator is "no overlap" while the observed overlap indicator is "overlap" and/or "yield"), the incorrect object behavior prediction for Object 2 630-2 is determined to be more important as it has a greater impact on driving behavior of the AV 620. Therefore, Object 2 Prediction 634-2 can be placed ahead of Object 1 Prediction 634-1 in the modification order.

Hypothetically, assume that the prediction and observed indicators corresponding to Object 1 630-1 are in fact different (e.g., a spatial overlap between Object 1 630-1 and the AV 620 is observed). In this case, one or more additional methods can be used to discriminate between the incorrect object behavior predictions for Object 1 630-1 and Object 2 630-2. For example, a time-to-overlap method can be used. To perform the time-to-overlap method, a first time-to-overlap between Object 1 630-1 and the AV 620 can be obtained, and a second time-to-overlap between Object 2 630-2 and the AV 620 can be obtained. The placement of Object 1 Prediction 634-1 and Object 2 Prediction 634-2 within the modification order can be determined based on a comparison of the first time-to-overlap and the second time-to-overlap. For example, if the first time-to-overlap is less than the second time-to-overlap, Object 1 Prediction 634-1 can be placed ahead of Object 2 Prediction 634-2 in the modification order.

Figure 7:
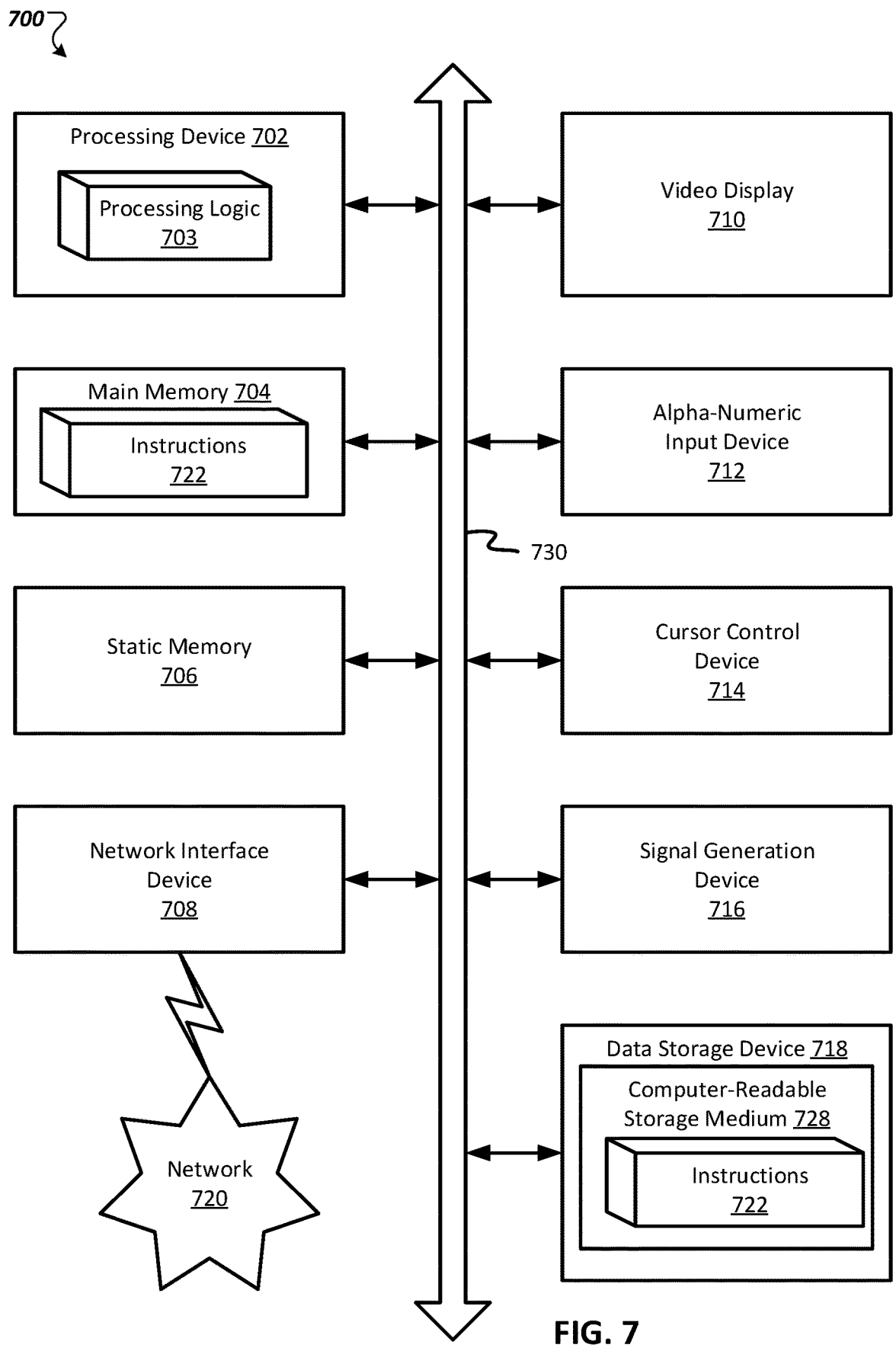
FIG. 7 is a block diagram of an example computer device within which a set of instructions, for causing the machine to perform any of the one or more methodologies discussed herein can be executed, in accordance with some implementations of the disclosure.

FIG. 7 depicts a block diagram of an example computer device 700 within which a set of instructions, for causing the machine to perform any of the one or more methodologies discussed herein can be executed, in accordance with some implementations of the disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 700 is an external (e.g., offboard) AV server. In some implementations, the AV 100 includes the computer device 700 (e.g., AVCS 140 includes computer device 700).

The computer device 700 can include a processing device 702 (also referred to as a processor or CPU), which can include processing logic 703, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 702 can be configured to execute instructions performing any of the operations performed by the AV server and/or the AVCS 140.

Example computer device 700 can further comprise a network interface device 1108, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the disclosure, executable instructions 722 can comprise executable instructions to perform any of the operations of AVCS 140.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation," "one implementation," "some implementations," "an implementation," "one implementation," "some implementations," or the like throughout may or may not mean the same implementation or implementation. One or more implementations or implementations described herein may be combined in a particular implementation or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
    a memory device; and
    a processing device, operatively coupled to the memory device, to:
        obtain a set of predicted behavior data comprising data indicative of one or more predicted object behaviors for one or more objects in an environment of an autonomous vehicle, respectively, wherein the one or more predicted object behaviors are each associated with a prediction indicator of a predicted spatial overlap state between the autonomous vehicle and a corresponding object;
        obtain a set of observed behavior data comprising data indicative of one or more observed object behaviors of the one or more objects, wherein the one or more observed object behaviors are each associated with an observation indicator of an observed spatial overlap state between the autonomous vehicle and the corresponding object;
        determine, based on a comparison of the set of predicted behavior data and the set of observed behavior data, whether a set of incorrect object behavior predictions exists within the set of predicted behavior data; and
        upon determining that the set of incorrect object behavior predictions exists, initiate, based on at least a generated subset of the set of incorrect object behavior predictions, one or more operations to address the set of incorrect object behavior predictions, wherein each incorrect object behavior prediction in the generated subset is associated with a respective error relevancy indicator that depends on at least a comparison between a corresponding observed spatial overlap state and a corresponding predicted spatial overlap state.

2. The system of claim 1, wherein the processing device is further to:
    prior to initiating the one or more operations to address the set of incorrect object behavior predictions, determine that the set of incorrect object behavior predictions satisfies a triggering condition.

3. The system of claim 1, wherein:
    each prediction indicator is one of: a no predicted overlap indicator identifying no predicted spatial overlap between the autonomous vehicle and the corresponding object, a predicted pass indicator identifying that the autonomous vehicle arrives at a predicted spatial overlap region before the corresponding object, a predicted yield indicator identifying that the autonomous vehicle arrives at the predicted spatial overlap region after the corresponding object, and a predicted collision indicator identifying that the autonomous vehicle and the corresponding object arrive at the predicted spatial overlap region at a substantially same time; and
    each observation indicator is one of: a no observed overlap indicator identifying no observed spatial overlap between the autonomous vehicle and the corresponding object, an observed pass indicator identifying that the autonomous vehicle arrives at an observed spatial overlap region before the corresponding object, an observed yield indicator identifying that the autonomous vehicle arrives at the observed spatial overlap region after the corresponding object, and an observed collision indicator identifying that the autonomous vehicle and the corresponding object arrive at the observed spatial overlap region at a substantially same time.

4. The system of claim 1, wherein:
    the set of incorrect object behavior predictions comprises a first incorrect object behavior prediction corresponding to a first object and a second incorrect object behavior prediction corresponding to a second object, the first incorrect object behavior prediction being associated with a first prediction indicator of a first predicted spatial overlap state and the second incorrect object behavior prediction being associated with a second prediction indicator of a second predicted spatial overlap state;
    the set of observed object behaviors comprises a first observed object behavior corresponding to the first object and a second observed object behavior corresponding to the second object, the first observed object behavior being associated with a first observation indicator of a first observed spatial overlap state and the second observed object behavior is associated with a second observation indicator of a second observed spatial overlap state; and
    to initiate the one or more operations to address the set of incorrect object predictions, the processing device is further to:

associate the first incorrect object behavior prediction with a first error relevancy indicator of a first relevancy upon determining that the first predicted spatial overlap state does not match the first observed spatial overlap state; and associate the second incorrect object behavior prediction with a second error relevancy indicator of a second relevancy upon determining that the first predicted spatial overlap state matches the first observed spatial overlap state, the first relevancy being greater than the second relevancy, and the first error relevancy indicator representing a higher priority of the first incorrect object behavior prediction with respect to the second incorrect object behavior prediction within the generated subset.

5. The system of claim 4, wherein:

the set of incorrect object behavior predictions further comprises a third incorrect object behavior prediction corresponding to a third object, the third incorrect object behavior prediction being associated with a third prediction indicator of a third predicted spatial overlap state;

the set of observed object behaviors further comprises a third observed object behavior corresponding to the third object, the third observed object behavior being associated with a third observation indicator of a third observed spatial overlap state; and to initiate the one or more operations to address the set of incorrect object predictions, the processing device is further to:

associate the third incorrect object behavior prediction with a third error relevancy indicator of a third relevancy upon determining that the third predicted spatial overlap state does not match the third observed spatial overlap state, and a time-to-overlap with respect to the observed spatial overlap corresponding to the first object is less than a time-to-overlap with respect to the observed spatial overlap corresponding to the third object;

wherein the third relevancy is greater than the second relevancy and lower than the first relevancy, and the third error relevancy indicator represents a higher priority of the third incorrect object behavior prediction with respect to the second incorrect object behavior prediction and a lower priority of the third incorrect object behavior prediction with respect to the first incorrect object behavior prediction within the generated subset.

6. The system of claim 1, wherein:

the set of predicted behavior data is obtained from a behavior prediction system of the autonomous vehicle;

the behavior prediction system comprises an object behavior module that is programmed to predict object behaviors using a set of rules; and to initiate the one or more operations to address the set of incorrect object behavior predictions, the processing device is further to generate the generated subset of incorrect behavior predictions, wherein the generated subset is used to modify the set of rules for reprogramming the object behavior module of the behavior prediction system.

7. The system of claim 6, wherein the incorrect behavior predictions in the generated subset are sorted in accordance with respective error relevancy indicators to ensure that modification of the set of rules begins with rules that correspond to higher priority incorrect object behavior predictions.

8. The system of claim 1, wherein:

the set of predicted behavior data is obtained from a behavior prediction system of the autonomous vehicle;

the behavior prediction system comprises a machine learning model that is trained to predict object behaviors using training data; and to initiate the one or more operations to address the set of incorrect object behavior predictions, the processing device is further to provide the generated subset as additional training data to retrain the machine learning model of the behavior prediction system.

9. The system of claim 8, wherein the additional training data used to retrain the machine learning model further includes a respective error relevancy indicator of each incorrect object behavior prediction from the generated subset.

10. A method comprising:

obtaining, by a processing device, a set of predicted behavior data comprising data indicative of one or more predicted object behaviors for one or more objects in an environment of an autonomous vehicle, respectively, wherein the one or more predicted object behaviors are each associated with a prediction indicator of a predicted spatial overlap state between the autonomous vehicle and a corresponding object;

obtaining, by the processing device, a set of observed behavior data comprising data indicative of one or more observed object behaviors of the one or more objects, wherein the one or more observed object behaviors are each associated with an observation indicator of an observed spatial overlap state between the autonomous vehicle and the corresponding object;

determining, by the processing device based on a comparison of the set of predicted behavior data and the set of observed behavior data, whether a set of incorrect object behavior predictions exists within the set of predicted behavior data; and upon determining that the set of incorrect object behavior predictions exists, initiating, by the processing device based on at least a generated subset of the set of incorrect object behavior predictions, one or more operations to address the set of incorrect object behavior predictions, wherein each incorrect object behavior prediction in the generated subset is associated with a respective error relevancy indicator that depends on at least a comparison between a corresponding observed spatial overlap state and a corresponding predicted spatial overlap state.

11. The method of claim 10, further comprising:

prior to initiating the one or more operations to address the set of incorrect object behavior predictions, determining, by the processing device, that the set of incorrect object behavior predictions satisfies a triggering condition.

12. The method of claim 10, wherein:

each prediction indicator is one of: a no predicted overlap indicator identifying no predicted spatial overlap between the autonomous vehicle and the corresponding object, a predicted pass indicator identifying that the autonomous vehicle arrives at a predicted spatial overlap region before the corresponding object, a predicted yield indicator identifying that the autonomous vehicle arrives at the predicted spatial overlap region after the corresponding object, and a predicted collision indicator identifying that the autonomous vehicle and the corresponding object arrive at the predicted spatial overlap region at a substantially same time; and each observation indicator is one of: a no observed overlap indicator identifying no observed spatial overlap between the autonomous vehicle and the corresponding object, an observed pass indicator identifying that the autonomous vehicle arrives at an observed spatial overlap region before the corresponding object, an observed yield indicator identifying that the autonomous vehicle arrives at the observed spatial overlap region after the corresponding object, and an observed collision indicator identifying that the autonomous vehicle and the corresponding object arrive at the observed spatial overlap region at a substantially same time.

13. The method of claim 10, wherein:
the set of incorrect object behavior predictions comprises a first incorrect object behavior prediction corresponding to a first object and a second incorrect object behavior prediction corresponding to a second object, the first incorrect object behavior prediction being associated with a first prediction indicator of a first predicted spatial overlap state and the second incorrect object behavior prediction being associated with a second prediction indicator of a second predicted spatial overlap state;
the set of observed object behaviors comprises a first observed object behavior corresponding to the first object and a second observed object behavior corresponding to the second object, the first observed object behavior being associated with a first observation indicator of a first observed spatial overlap state and the second observed object behavior is associated with a second observation indicator of a second observed spatial overlap state; and
initiating the one or more operations to address the set of incorrect object predictions further comprises:
associating the first incorrect object behavior prediction with a first error relevancy indicator of a first relevancy upon determining that the first predicted spatial overlap state does not match the first observed spatial overlap state; and
associating the second incorrect object behavior prediction with a second error relevancy indicator of a second relevancy upon determining that the first predicted spatial overlap state matches the first observed spatial overlap state, the first relevancy being greater than the second relevancy, and the first error relevancy indicator representing a higher priority of the first incorrect object behavior prediction with respect to the second incorrect object behavior prediction within the generated subset.

14. The method of claim 13, wherein:
the set of incorrect object behavior predictions further comprises a third incorrect object behavior prediction corresponding to a third object, the third incorrect object behavior prediction being associated with a third prediction indicator of a third predicted spatial overlap state;
the set of observed object behaviors further comprises a third observed object behavior corresponding to the third object, the third observed object behavior being associated with a third observation indicator of a third observed spatial overlap state; and
initiating the one or more operations to address the set of incorrect object predictions further comprises:
associating the third incorrect object behavior prediction with a third error relevancy indicator of a third relevancy upon determining that the third predicted spatial overlap state does not match the third observed spatial overlap state, and a time-to-overlap with respect to the observed spatial overlap corresponding to the first object is less than a time-to-overlap with respect to the observed spatial overlap corresponding to the third object;
wherein the third relevancy is greater than the second relevancy and lower than the first relevancy, and the third error relevancy indicator represents a higher priority of the third incorrect object behavior prediction with respect to the second incorrect object behavior prediction and a lower priority of the third incorrect object behavior prediction with respect to the first incorrect object behavior prediction within the generated subset.

15. The method of claim 10, wherein:
the set of predicted behavior data is obtained from a behavior prediction system of the autonomous vehicle;
the behavior prediction system comprises an object behavior module that is programmed to predict object behaviors using a set of rules; and
initiating the one or more operations to address the set of incorrect object behavior predictions further comprises generating the generated subset of incorrect behavior predictions, wherein the generated subset is used to modify the set of rules for reprogramming the object behavior module of the behavior prediction system.

16. The method of claim 15, wherein the incorrect behavior predictions in the generated subset are sorted in accordance with respective error relevancy indicators to ensure that modification of the set of rules begins with rules that correspond to higher priority incorrect object behavior predictions.

17. The method of claim 10, wherein:
the set of predicted behavior data is obtained from a behavior prediction system of the autonomous vehicle;
the behavior prediction system comprises a machine learning model that is trained to predict object behaviors using training data; and
initiating the one or more operations to address the set of incorrect object behavior predictions further comprises providing the generated subset as additional training data to retrain the machine learning model of the behavior prediction system, wherein the additional training data used to retrain the machine learning model further includes a respective error relevancy indicator of each incorrect object behavior prediction from the generated subset.

18. A non-transitory computer-readable storage medium having instructions stored thereon that, when executed by a processing device, cause the processing device to:
obtain, from a behavior prediction system of an autonomous vehicle, a set of predicted behavior data comprising data indicative of one or more predicted object behaviors for one or more objects in an environment of the autonomous vehicle, respectively, wherein the one or more predicted object behaviors are each associated with a prediction indicator of a predicted spatial overlap state between the autonomous vehicle and a corresponding object;
obtain, from a behavior observation system of the autonomous vehicle, a set of observed behavior data comprising data indicative of one or more observed object behaviors of the one or more objects, wherein the one or more observed object behaviors are each associated with an observation indicator of an observed spatial overlap state between the autonomous vehicle and the corresponding object;

determine, based on a comparison of the set of predicted behavior data and the set of observed behavior data, whether a set of incorrect object behavior predictions exists within the set of predicted behavior data;

determine that the set of incorrect object behavior predictions satisfies a triggering condition; and upon determining that the set of incorrect object behavior predictions satisfies the triggering condition, initiate, based on at least a generated subset of the set of incorrect object behavior predictions, one or more operations to modify the behavior prediction system, wherein each incorrect object behavior prediction in the generated subset is associated with a respective error relevancy indicator that depends on at least a comparison between a corresponding observed spatial overlap state and a corresponding predicted spatial overlap state.

19. The non-transitory computer-readable storage medium of claim 18, wherein:

each prediction indicator is one of: a no predicted overlap indicator identifying no predicted spatial overlap between the autonomous vehicle and the corresponding object, a predicted pass indicator identifying that the autonomous vehicle arrives at a predicted spatial overlap region before the corresponding object, a predicted yield indicator identifying that the autonomous vehicle arrives at the predicted spatial overlap region after the corresponding object, and a predicted collision indicator identifying that the autonomous vehicle and the corresponding object arrive at the predicted spatial overlap region at a substantially same time; and each observation indicator is one of: a no observed overlap indicator identifying no observed spatial overlap between the autonomous vehicle and the corresponding object, an observed pass indicator identifying that the autonomous vehicle arrives at an observed spatial overlap region before the corresponding object, an observed yield indicator identifying that the autonomous vehicle arrives at the observed spatial overlap region after the corresponding object, and an observed collision indicator identifying that the autonomous vehicle and the corresponding object arrive at the observed spatial overlap region at a substantially same time.

20. The non-transitory computer-readable storage medium of claim 19, wherein:

the set of incorrect object behavior predictions comprises a first incorrect object behavior prediction corresponding to a first object and a second incorrect object behavior prediction corresponding to a second object, the first incorrect object behavior prediction being associated with a first prediction indicator of a first predicted spatial overlap state and the second incorrect object behavior prediction being associated with a second prediction indicator of a second predicted spatial overlap state;

the set of observed object behaviors comprises a first observed object behavior corresponding to the first object and a second observed object behavior corresponding to the second object, the first observed object behavior being associated with a first observation indicator of a first observed spatial overlap state and the second observed object behavior is associated with a second observation indicator of a second observed spatial overlap state; and to initiate the one or more operations to address the set of incorrect object predictions, the processing device is further to:

associate the first incorrect object behavior prediction with a first error relevancy indicator of a first relevancy upon determining that the first predicted spatial overlap state does not match the first observed spatial overlap state; and associate the second incorrect object behavior prediction with a second error relevancy indicator of a second relevancy upon determining that the first predicted spatial overlap state matches the first observed spatial overlap state, the first relevancy being greater than the second relevancy, and the first error relevancy indicator representing a higher priority of the first incorrect object behavior prediction with respect to the second incorrect object behavior prediction within the generated subset.

* * * * *